United States Patent
Kimura et al.

(10) Patent No.: US 7,408,543 B2
(45) Date of Patent: Aug. 5, 2008

(54) VOLTAGE-SUPPLY CIRCUIT, VOLTAGE-SUPPLY METHOD, POWER-SUPPLY CIRCUIT, ELECTRO-OPTICAL UNIT, AND ELECTRONIC APPARATUS

(75) Inventors: Fusashi Kimura, Suwa (JP); Satoshi Yatabe, Suwa (JP); Kenichi Tajiri, Suwa (JP)

(73) Assignee: Seiko Epson Corporation (JP)

( * ) Notice: Subject to any disclaimer, the term of this patent is extended or adjusted under 35 U.S.C. 154(b) by 528 days.

(21) Appl. No.: 11/070,408

(22) Filed: Mar. 1, 2005

(65) Prior Publication Data

US 2005/0195542 A1 Sep. 8, 2005

(30) Foreign Application Priority Data

Mar. 3, 2004 (JP) .............................. 2004-059301

(51) Int. Cl.
*G09G 5/00* (2006.01)

(52) U.S. Cl. ....................... 345/211; 345/204; 345/213; 345/215

(58) Field of Classification Search ................. 345/211, 345/204, 213, 215, 86–100, 212, 60–73; 362/21.12; 363/60, 63, 59; 365/189.09; 348/505; 257/339, 239; 327/541; 361/18, 361/90, 152
See application file for complete search history.

(56) References Cited

U.S. PATENT DOCUMENTS

| | | | | |
|---|---|---|---|---|
| 4,056,826 A | * | 11/1977 | Watanabe et al. | ............ 348/505 |
| 5,128,730 A | * | 7/1992 | Coe et al. | .................... 257/339 |
| 5,812,021 A | * | 9/1998 | Ikeda | .......................... 327/541 |
| 6,297,622 B1 | * | 10/2001 | Yatabe | ......................... 323/222 |
| 6,370,045 B1 | * | 4/2002 | Lurkens | .................... 363/21.12 |
| 6,556,064 B1 | * | 4/2003 | Yatabe | ......................... 327/536 |
| 6,603,673 B2 | * | 8/2003 | Yamamoto | .................... 363/60 |
| 6,633,287 B1 | * | 10/2003 | Yatabe et al. | ............... 345/211 |
| 6,853,563 B1 | * | 2/2005 | Yang et al. | ............... 363/21.15 |
| 7,012,841 B1 | * | 3/2006 | Nahas | .................... 365/189.09 |
| 7,167,154 B2 | * | 1/2007 | Sato et al. | .................... 345/100 |
| 2002/0145893 A1 | * | 10/2002 | Yamamoto | .................... 363/59 |
| 2003/0197696 A1 | * | 10/2003 | Onozawa et al. | ............ 345/212 |

FOREIGN PATENT DOCUMENTS

| | | |
|---|---|---|
| JP | 2000-278938 | 10/2000 |
| JP | 2001-117649 | 4/2001 |

* cited by examiner

*Primary Examiner*—Prabodh Dharia
(74) *Attorney, Agent, or Firm*—Harness, Dickey & Pierce, P.L.C.

(57) ABSTRACT

A power-supply circuit includes a capacitor, which is connected to a terminal at a first end while being grounded at the second end, for supplying a hold voltage between both ends thereof to a load; a capacitor connected, via a diode, to the terminal at a first end; an operational amplifier for raising a voltage at the second end of the capacitor, in response to a reduction in the hold voltage, such that the hold voltage becomes equal to a target voltage; and a transistor.

10 Claims, 7 Drawing Sheets

US 7,408,543 B2

VOLTAGE-SUPPLY CIRCUIT, VOLTAGE-SUPPLY METHOD, POWER-SUPPLY CIRCUIT, ELECTRO-OPTICAL UNIT, AND ELECTRONIC APPARATUS

RELATED APPLICATIONS

This application claims priority to Japanese Patent Application No. 2004-059301 filed Mar. 3, 2004 which is hereby expressly incorporated by reference herein in its entirety.

BACKGROUND

1. Technical Field

The present invention relates to a technology for supplying a low-ripple voltage to a load.

2. Related Art

Portable electronic apparatuses, which are required to be thin and lightweight, include displays using electro-optical devices, such as liquid-crystal devices and organic-electroluminescent (EL) devices, that can meet such requirements. Since a voltage required for driving an electro-optical device is higher than a voltage of 3 to 5 V for activating a logic of an electronic apparatus, a power-supply circuit is required for the electronic apparatus to boost a single direct-current voltage of a battery or the like.

A variety of power-supply circuits of this type are available. In a portable electronic apparatus for which compactness, simplicity, low power consumption, and the like are required, a power-supply circuit is generally configured such that a voltage generated by turning on and off (switching) is held in a capacitor (holding device) provided at an output stage while being smoothed and supplied to a load (see, for example, Japanese Unexamined Patent Application Publication No. 2000-278938 and Japanese Unexamined Patent Application Publication No. 2001-117649).

Although the capacitor is provided at the output stage of the power-supply circuit, some ripples appear since the voltage across the capacitor is increased by switching while being gradually attenuated with power consumption by a load. It is desired that such ripples be minimized because they cause fluctuations in the root-mean-square (rms) value of a voltage applied to the electro-optical device and affect the quality of display.

The present invention has been made in view of the circumstances described above, and its object is to provide a voltage-supply circuit, a voltage-supply method, a power-supply circuit, an electro-optical unit, and an electronic apparatus that can supply a low-ripple voltage.

SUMMARY

To achieve the object described above, a voltage-supply circuit of the present invention includes a first holding device including a first end and a second end with a voltage held therebetween, the first holding device supplying the voltage to a load; a second holding device including a first end and a second end with a voltage held therebetween, the first end being electrically connected to the first end of the first holding device; and a potential-control circuit that shifts potential at the second end of the second holding device, according to the voltage held at the first holding device or at the second holding device, toward potential at the first end of the first holding device. In this voltage-supply circuit, the potential at the second end of the second holding device approaches the potential at the first end of the first holding device, according to the hold voltage of the first holding device or the hold voltage of the second holding device. This allows electric charges to move from the second holding device to the first holding device, stabilizes the hold voltage of the first holding device, and thus reduces ripples in output voltage.

In the voltage-supply circuit of the present invention, it is preferable for the potential-control circuit to shift the potential at the second end of the second holding device such that the voltage held at the first holding device becomes equal to a predetermined target voltage. In this configuration, feedback control is performed over the potential at the second end of the second holding device such that the hold voltage of the first holding device becomes equal to the target voltage.

In this configuration, it is preferable that the potential-control circuit includes an operational amplifier to which a voltage corresponding to the hold voltage of the first holding device and a reference voltage corresponding to the target voltage are inputted; and a transistor with a source and a drain that are located between a predetermined potential line and the first holding device and are electrically connected thereto, respectively. In this configuration, the resistance of the transistor is controlled such that the hold voltage of the first holding device becomes equal to the target voltage. Moreover, the potential at the second end of the second holding device is shifted according to the current flowing in the transistor (current flowing in the load). Eventually, feedback control is performed over the resistance of the transistor such that the hold voltage of the first holding device becomes equal to the target voltage.

To achieve the object described above, a voltage-supply method of the present invention is a method for supplying the voltage held between first end and the second end of a first holding device to a load, wherein: according to the voltage held at the first holding device or at a second holding device having first end electrically connected to the first end of the first holding device, potential at the second end of the second holding device is shifted toward potential at the first end of the first holding device. In this voltage-supply method, the potential at the second end of the second holding device approaches the potential at the first end of the first holding device, according to the hold voltage of the first holding device or the hold voltage of the second holding device. This allows electric charges to move from the second holding device to the first holding device, stabilizes the hold voltage of the first holding device, and thus reduces ripples in output voltage.

There is a limitation to shift the potential at the second end of the second holding device. Therefore, a power-supply circuit of the present invention includes a first holding device including a first end and a second end with a voltage held therebetween, the first holding device supplying the voltage to a load; a second holding device including a first end and a second end with a voltage held therebetween, the first end being electrically connected to the first end of the first holding device; a threshold determiner that determines whether or not potential at the second end of the second holding device reaches a predetermined threshold; a switch that, during a first mode, turns on and off at least once when the threshold determiner determines that the threshold is reached; and a potential-control circuit that: in the first mode brings the potential at the second end of the second holding device to a predetermined potential and controls so that the voltage generated by turning on and off the switch is held in the second holding device; and in a second mode, shifts the potential at the second end of the second holding device, according to the voltage held at the first holding device or second holding device, toward potential at the first end of the first holding device. In this power-supply circuit, a voltage generated by turning on and off the switch is held in the second holding device when the potential at the second end of the second holding device reaches the threshold. Thus, the hold voltage of the first holding device can be stabilized again. Here, the switch includes a switching device, such as a transistor, and an inverter.

In the power-supply circuit of the present invention, it is preferable for the potential-control circuit to include an operational amplifier to which a voltage corresponding to the hold voltage of the first holding device and a reference voltage corresponding to the target voltage are inputted; and a first transistor and a second transistor connected in series between predetermined voltages; wherein the second end of the first holding device is electrically connected to a drain of the first transistor and to a drain of the second transistor; an output signal of the operational amplifier is supplied to a gate of the first transistor; and the second transistor is in an ON state in the first mode and is in an OFF state in the second mode.

The power-supply circuit of the present invention may further include an inductor for storing power when the switch is in an ON state, while releasing power when the switch is in an OFF state; wherein the second holding device holds a voltage at which power is released from the inductor.

An electro-optical unit of the present invention includes any first of the power-supply circuits described above; pixels, each corresponding to each of the intersections of a plurality of scanning lines and a plurality of data lines; a scanning-line-driving circuit for sequentially selecting the scanning lines and applying the voltage held in the first holding device as a selection voltage to a scanning line selected; and a data-line-driving circuit for supplying a data signal, via a data line, to a pixel corresponding to a scanning line to which a selection voltage is applied. Degradation of the display quality can be prevented in this electro-optical unit, since a low-ripple voltage held in the first holding device included in the power-supply circuit is used as a selection voltage for a scanning line.

When the switch is turned on and off in the power-supply circuit described above, a potential shift is not functioned as the voltage generated is held in the second holding device (first mode). Therefore, in the electro-optical unit, it is preferable, during the period in which a voltage held in the first holding device is applied as a selection voltage, that the power-supply circuit is fixed at the second mode and is prohibited from changing to the first mode.

Moreover, since an electronic apparatus of the present invention includes the electro-optical unit described above, degradation of the display quality due to ripples can be prevented.

DETAILED DESCRIPTION

The best mode for carrying out the present invention will now be described with reference to the drawings.

First Embodiment

Figure 1:
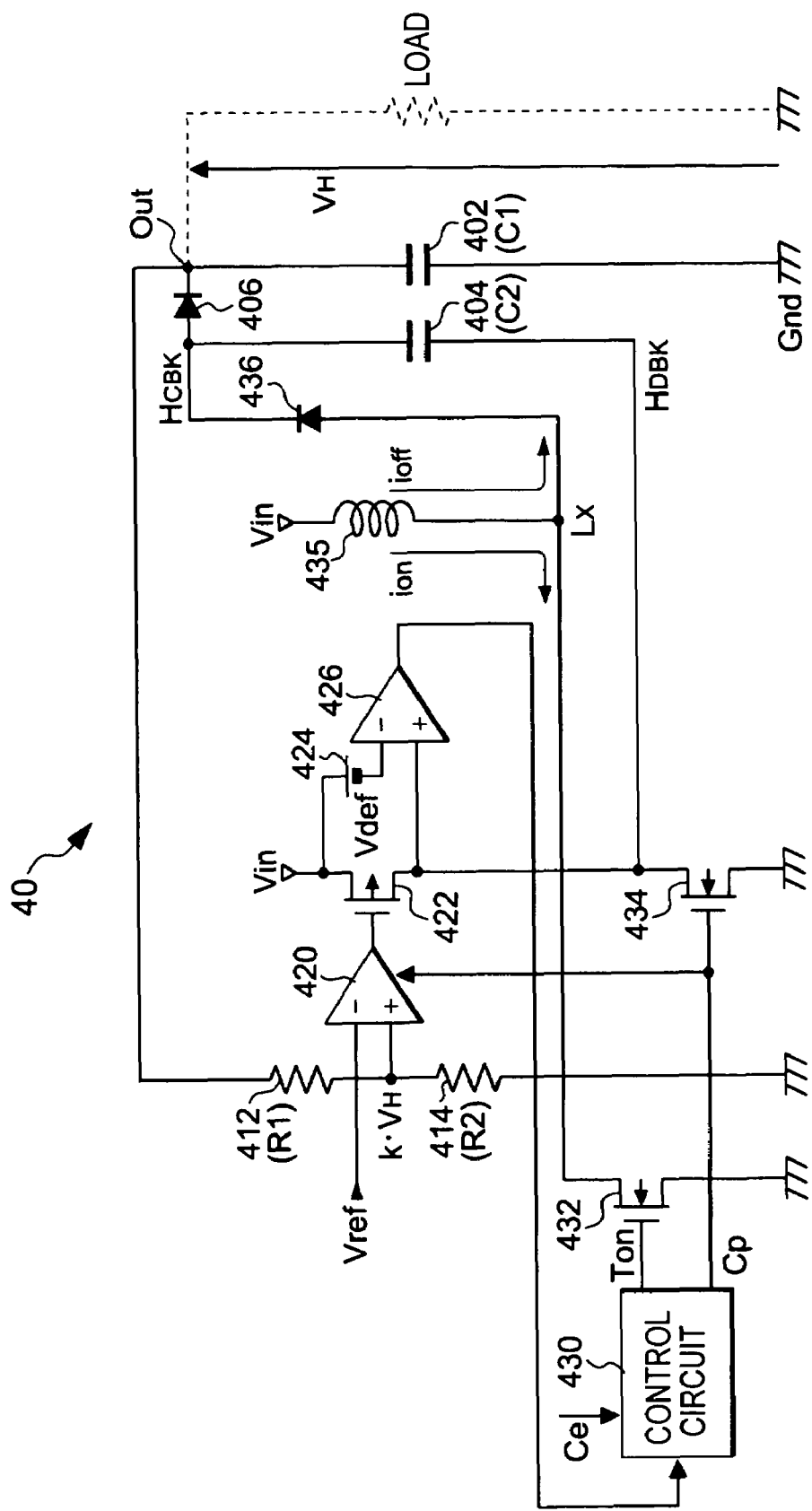
FIG. 1 shows the configuration of a power-supply circuit according to a first embodiment of the present invention.

A power-supply circuit according to a first embodiment of the present invention will be described. FIG. 1 is a diagram showing the configuration of the power-supply circuit. A power-supply circuit 40 is a switching regulator for boosting a voltage ($V_{in}$-Gnd) of a secondary battery or the like to generate a voltage $V_H$.

Referring to FIG. 1, first end of a capacitor (first holding device) 402 is connected to a terminal Out while the second end thereof is grounded at a potential Gnd. The voltage $V_H$ held between both ends is supplied to a load. First end of a capacitor (second holding device) 404 is connected to the first end (terminal Out) of the capacitor 402 via a diode 406 connected in the forward direction.

Unless otherwise specified, in the present embodiment, a voltage will be described relative to the ground potential Gnd. For convenience of explanation, a voltage at the first end of the capacitor 404 is indicated by $H_{CBK}$, and a voltage at the second end thereof is indicated by $H_{DBK}$.

A resistor 412 with a resistance of R1 and a resistor 414 with a resistance of R2 are connected in series between the first end (terminal Out) of the capacitor 402 and the ground potential Gnd. The junction of the resistor 412 and the resistor 414 is connected to the positive input terminal of an operational amplifier 420. A voltage supplied to the positive input terminal of the operational amplifier 420 is a voltage obtained by dividing the output voltage $V_H$ by the resistors 412 and 414, and is indicated by $k \cdot V_H (0<k<1)$. A reference voltage $V_{ref}$ is supplied to the negative input terminal of the operational amplifier 420. In the present embodiment, the reference voltage $V_{ref}$ is set to be $V_A \cdot R2/(R1+R2)$, where the output voltage $V_H$ is a target voltage $V_A$.

The output of the operational amplifier 420 is connected to the gate of a P-channel-type transistor (first transistor) 422. The source of the transistor 422 is connected to a feed line for the voltage $V_{in}$, while the drain of the transistor 422 is connected to the second end of the capacitor 404, to the positive input terminal of a comparator (threshold determiner) 426, and to the drain of an N-channel-type transistor (second transistor) 434.

The positive terminal of a reference-voltage supply 424 is connected to the feed line for the voltage $V_{in}$, while the negative terminal thereof is connected to the negative input terminal of the comparator 426. If the output voltage of the reference-voltage supply 424 is $V_{def}$, the output signal of the comparator 426 is changed to H level when the drain voltage of the transistor 422 (that is, the voltage $H_{DBK}$) applied to the positive input terminal reaches a voltage applied to the negative input terminal ($V_{in}-V_{def}$).

During the period in which a signal $C_e$ described below is at H level, when the output signal of the comparator 426 is changed to H level, a control circuit 430 outputs a pulse signal $T_{on}$ having a positive pulse width of period $T_{w1}$ and a pulse signal $C_p$ having a positive pulse width of period $T_{w2}$. Here, the relationship between the periods $T_{w1}$ and $T_{w2}$ can be expressed as $T_{w1}<T_{w2}$. During the period in which the signal $C_e$ is at L level, regardless of the output signal of the comparator 426, the control circuit 430 fixes the signals $T_{on}$ and $C_p$ to L level and prohibits the output of the positive pulse.

The signal $T_{on}$ outputted from the control circuit 430 is supplied to the gate of an N-channel-type transistor (switch)

432. The source of the transistor 432 is grounded at the potential Gnd, while the drain is connected to the second end of an inductor 435 and to the first end of the capacitor 404 via a diode 436 connected in the forward direction. First end of the inductor 435 is connected to the feed line for the voltage $V_{in}$. The voltage at the second end of the inductor 435 is indicated by $L_X$.

The signal $C_p$ is supplied to the gate of the transistor 434 and to the operational amplifier 420. The source of the transistor 434 is grounded at the potential Gnd. When the signal $C_p$ is at H level, the operational amplifier 420 forces the output signal to H level to turn off the transistor 422.

Operation of First Embodiment

Figure 2:
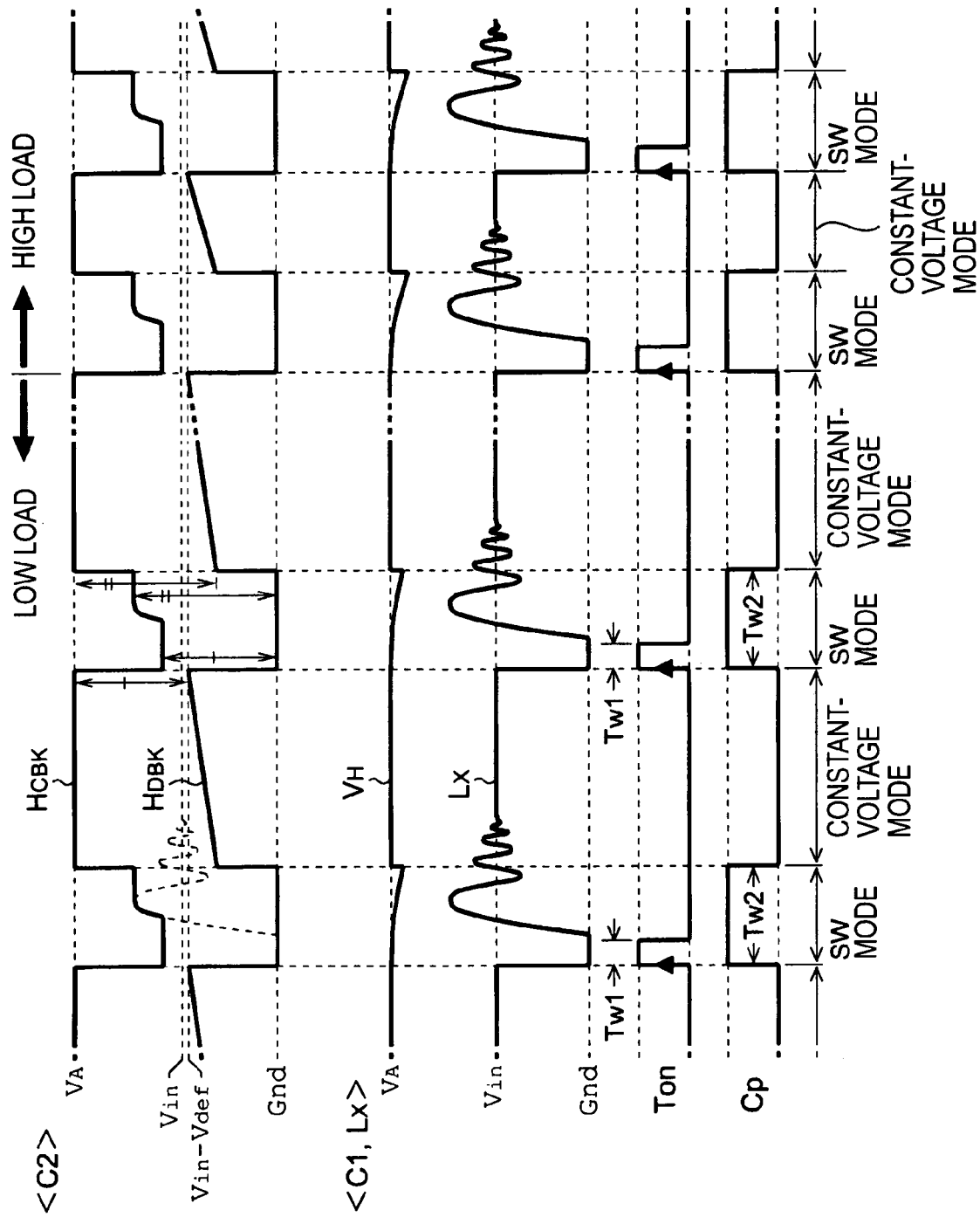
FIG. 2 is a waveform diagram showing the voltage at each point for explaining the operation of the power-supply circuit.

The operation of the power-supply circuit 40 will now be described with reference to FIG. 2. FIG. 2 shows voltage waveforms at respective points in the power-supply circuit 40.

Since the control circuit 430 is powered by the voltage ($V_{in}$-Gnd), each of the signals $T_{on}$ and $C_p$ has an amplitude ranging from about $V_{in}$ at H level and about Gnd at L level. Note that the amplitude scale for the signals $T_{on}$ and $C_p$ is different from that for the other waveforms.

Operation in Constant-Voltage Mode

For convenience, the operation in a constant-voltage mode (second mode), in which the $C_p$ is at L level, will be described. When the $C_p$ is at L level, the transistor 434 is in the OFF state and switching (between ON and OFF) of the transistor 432 is not performed since the signal $T_{on}$ does not shift to H level. Therefore, the circuit in FIG. 1 is equivalent to a simple circuit shown in FIG. 3.

Figure 3:
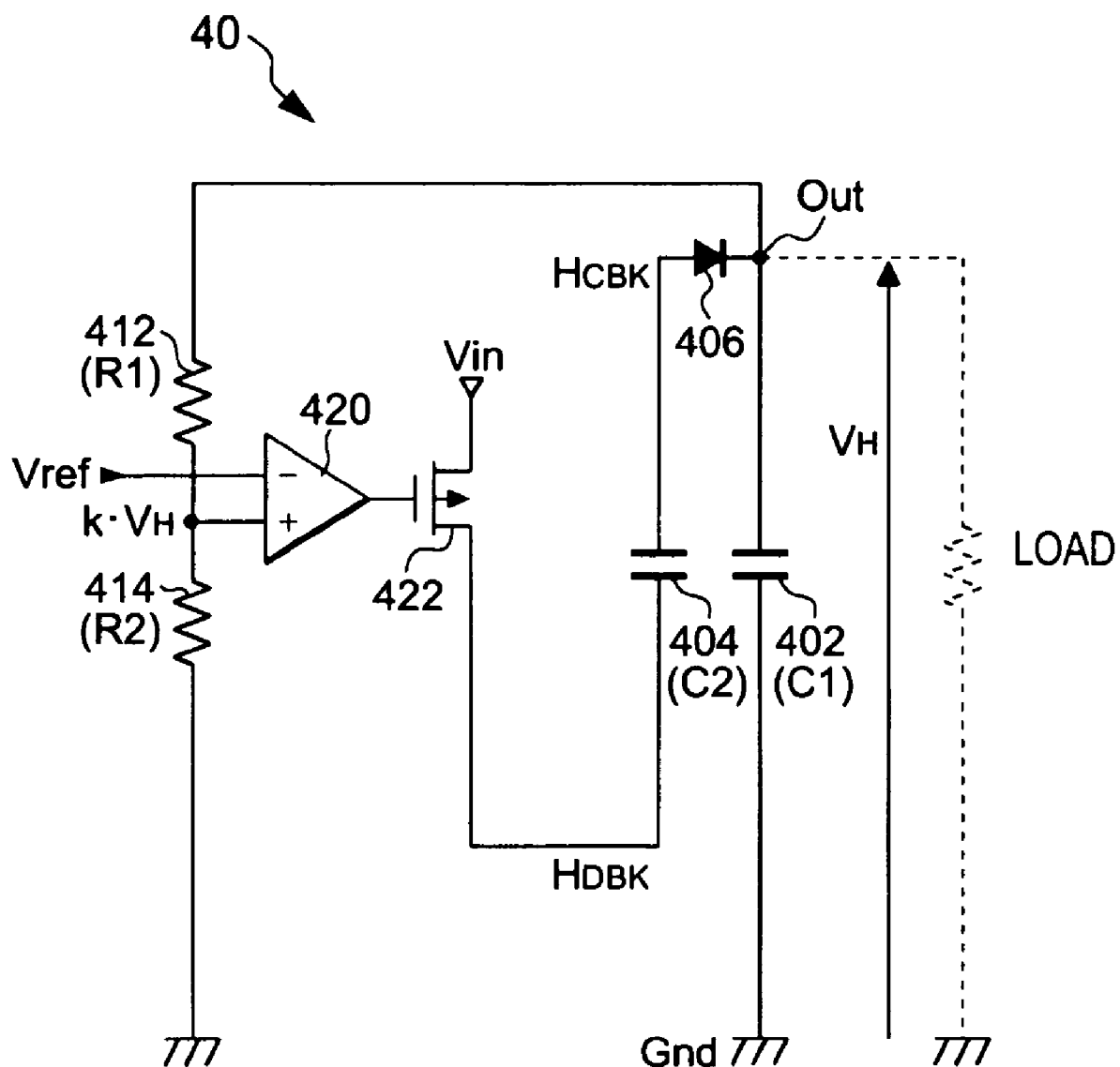
FIG. 3 is an equivalent circuit diagram of the power-supply circuit in a constant-voltage mode.

Referring to FIG. 3, the ON-resistance of the transistor 422 is determined by the output voltage of the operational amplifier 420. Then the ON-resistance of the transistor 422 determines the voltage $H_{DBK}$ at the second end of the capacitor 404. The divided voltage $k \cdot V_H$ of a value obtained by adding the hold voltage of the capacitor 404 to the voltage $H_{DBK}$ (that is, the voltage $V_H$) is fed back to the operational amplifier 420. When the divided voltage $k \cdot V_H$ drops below the reference voltage $V_{ref}$, the output voltage of the operational amplifier 420 also drops. When the output voltage drops, the resistance between the source and drain of the transistor 422 drops according to the value of a current flowing from the feed line for the voltage $V_{in}$ through the transistor 422 and the load, while the voltage $H_{DBK}$ at the second end of the capacitor 404 rises. When the rise in the voltage $H_{DBK}$ causes a voltage obtained by adding the hold voltage of the capacitor 404 to the voltage $H_{DBK}$ (that is, the voltage $H_{CBK}$ at the first end of the capacitor 404) to rise above or equal to the hold voltage $V_H$ of the capacitor 402 (in the strict sense, a voltage obtained by adding the amount of voltage drop of the diode 406 to the hold voltage $V_H$), electric charges are transferred from the capacitor 404 to the capacitor 402 to raise the $V_H$.

That is, the operational amplifier 420 and the transistor 422 perform control to raise the voltage $V_H$ such that the divided voltage $k \cdot V_H$ and the reference voltage $V_{ref}$, which are in a virtual-short-circuit relationship, are equal even if the voltage $V_H$ drops due to power consumption by the load. Since the divided voltage $k \cdot V_H$ is $V_H \cdot R2/(R1+R2)$ and the reference voltage $V_{ref}$ is $V_A \cdot R2/(R1+R2)$ as described above, the operational amplifier 420 and the transistor 422 perform negative feedback control over the voltage (potential) $H_{DBK}$ at the second end of the capacitor 404 such that the voltage $V_H$ and the target voltage $V_A$ become equal.

Thus, a part of a potential-regulation circuit is constituted by both the operational amplifier 420 and the transistor 422.

Additionally, stabilization of the voltage $V_H$ by a transfer of electronic charges from the capacitor 404 to the capacitor 402 will be described. FIGS. 4A to 4D are provided for explaining the transfer of electronic charges in the capacitor 402 and the capacitor 404. In the drawings, the capacitance of each of the capacitors 402 and 404 is C1 and C2, respectively.

Figure 4A:
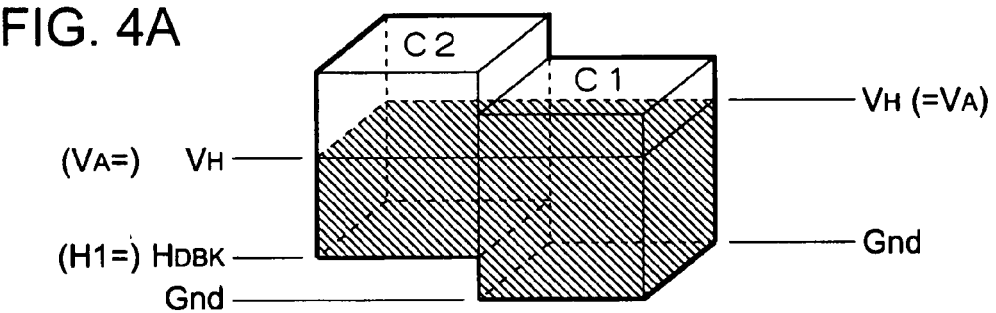
FIGS. 4A to 4D illustrate the operation of the power-supply circuit in the constant-voltage mode.

When the voltage $V_H$ across the capacitor 402 is equal to the target voltage $V_A$, as shown in FIG. 4A, the total electric charge stored in the capacitors 402 and 404 can be expressed as C1·-$V_A$+C2($V_A$-H1), where the voltage $H_{DBK}$ at the second end of the capacitor 404 is H1.

Figure 4B:
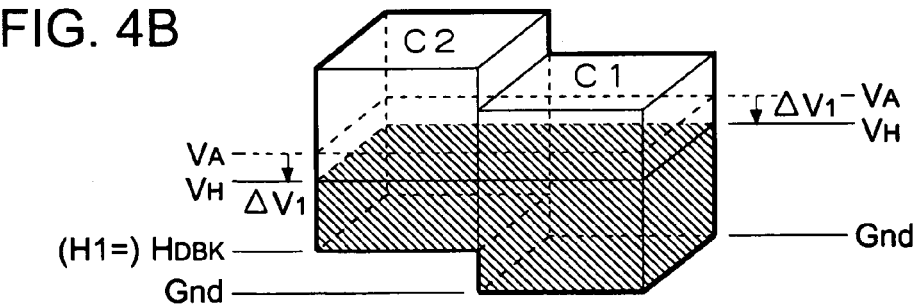

Assume, as shown in FIG. 4B, that the voltage $V_H$ across the capacitor 402 is reduced by $\Delta V1$ due to power consumption by the load. The voltage at the first end of the capacitor 404 is also reduced by $\Delta V1$ because the first end of the capacitor 404 is electrically connected to the terminal Out via the diode 406. Since the consumed electric charge is (C1+C2)$\Delta V1$, the residual charge in the capacitors 402 and 404 at this point is C1($V_A$-$\Delta V1$)+C2($V_A$-H1-$\Delta V1$).

Figure 4C:
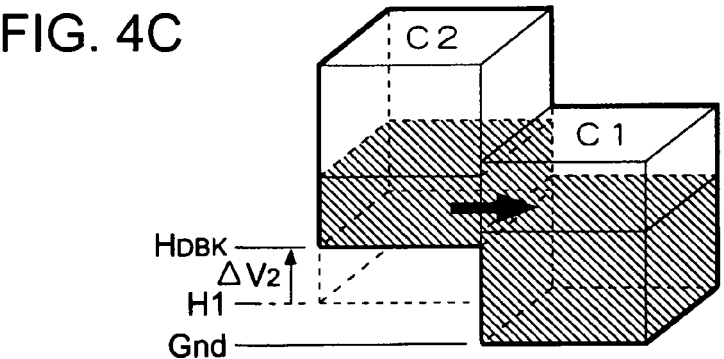

When the voltage $V_H$ drops, in the present embodiment, the voltage $H_{DBK}$ at the second end of the capacitor 404 is raised by $\Delta V2$, as shown in FIG. 4C, by negative feedback control of the operational amplifier 420 and transistor 422.

Figure 4D:
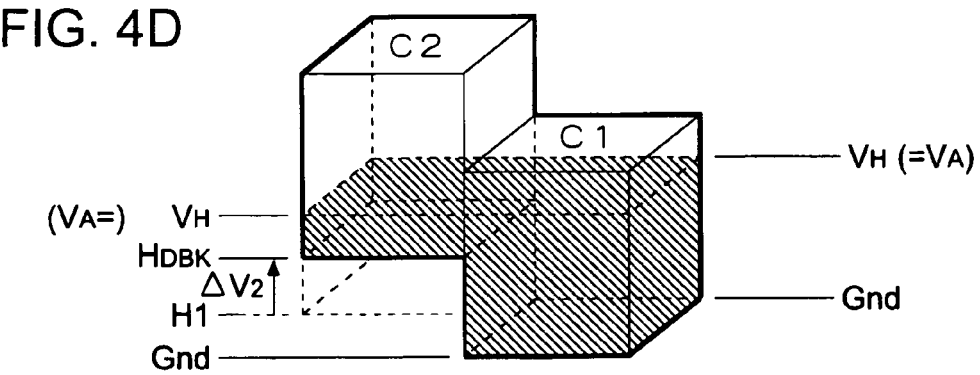

Since this allows electric charges to be transferred from the capacitor 404 to the capacitor 402, the voltage $V_H$ across the capacitor 402 becomes equal to the target voltage $V_A$ again, as shown in FIG. 4D.

At this point, the residual charge in the capacitors 402 and 404 is C1·$V_A$+C2($V_A$-H1-$\Delta V2$), which is equal to the residual charge in FIG. 4B. When both expressions are joined by an equal sign, $\Delta V2$ can be expressed as $$\Delta V2 = \Delta V1 (C1+C2)/C2 \ldots \quad (1)$$

Therefore, in the present embodiment, when the voltage at the terminal Out drops by $\Delta V1$, the operational amplifier 420 controls the ON-resistance of the transistor 422 such that the second end of the capacitor 404 is raised by (C1+C2)/C2 with respect to a drop of $\Delta V1$.

In practice, the operational amplifier 420 continuously controls the ON-resistance of the transistor 422. Therefore, the voltage $V_H$ at the terminal Out is not changed in stages as shown in FIGS. 4B and 4C, but is changed continuously and held constant at the target voltage $V_A$ as described above.

As is obvious from the equation (1) above, if the capacitance C1 of the capacitor 402 is large with respect to the capacitance C2 of the capacitor 404, the rise in the capacitor 404 is large with respect to the consumption of charge by the load. On the other hand, if the capacitance C1 of the capacitor 402 is absolutely small, the voltage $V_H$ is considerably attenuated in an SW mode described below. The capacitance ratio of the capacitors 402 and 404 and the capacitance of the capacitor 402 are determined in consideration of such circumstances.

For the transfer of electric charges from the capacitor 404 to the capacitor 402, in practice, the voltage $H_{CBK}$ at the second end of the capacitor 404 must be equal to or above the voltage obtained by adding a voltage drop $V_f$ occurring at the diode 406 to the voltage $V_H$ (that is, $V_H+V_f$). However, this is ignored in the description for FIGS. 4A to 4D.

Operation in SW Mode

In the constant-voltage mode, as described above, control is performed, by raising the voltage $H_{DBK}$ at the second end of the capacitor 404, such that the voltage $V_H$ is stabilized at the target voltage $V_A$. This control is based on the premise that the voltage $H_{DBK}$ is below the voltage $V_{in}$. The reason is that since the input voltage of the power-supply circuit 40 is $V_{in}$, a voltage equal to or above this voltage cannot be raised. Moreover, in practice, the voltage drop $V_f$ occurring at the diode 406 in the forward direction must be taken into consideration.

Therefore, in the present embodiment, the voltage drop $V_f$ in the diode 406 is simulated by the voltage $V_{def}$ of the reference-voltage supply 424. When the voltage $H_{DBK}$ at the second end of the capacitor 404 reaches the voltage $(V_{in}-V_{def})$ obtained by subtracting the voltage $V_{def}$ corresponding to the voltage drop $V_f$ in the diode 406 from the input voltage $V_{in}$, the SW mode (first mode) is entered to reduce the voltage $H_{DBK}$, while an operation is executed to store electric charges in the capacitor 404 again.

The output signal of the comparator 426 is brought to H level when the voltage $H_{DBK}$ at the second end of the capacitor 404 reaches the voltage $(V_{in}-V_{def})$. On condition that the signal $C_e$ is at H level, the control circuit 430 raises the signal $T_{on}$ and allows it to be held at H level for the period $T_{w1}$, while raising the signal $C_p$ and allows it to be held at H level for the period $T_{w2}$. When the signal $C_p$ is raised to H level, the transistor 434 is turned on, the output signal of the operational amplifier 420 is forced to H level, and thus the transistor 422 is turned off. Since this causes the second end of the capacitor 404 to be grounded at the potential Gnd, the voltage $H_{DBK}$ at the other end drops by the voltage $(V_{in}-V_{def})$ while the voltage $H_{CBK}$ at the first end of the capacitor 404, the voltage $H_{CBK}$ being held constant at the target voltage $V_A$, also drops by the voltage $(V_{in}-V_{def})$.

Since the transistor 432 is in the ON state during the period in which the signal $T_{on}$ is at H level, an ON-current $i_{on}$ flows from the feed line for the voltage $V_{in}$ through the inductor 435 toward the ground, thereby allowing energy to be stored.

Subsequently, when the signal $T_{on}$ is brought to L level, the transistor 432 is turned off to allow an OFF-current $i_{off}$ to flow. This OFF-current $i_{off}$ flows from the energy stored during the ON period of the transistor 432, in the forward direction of the diode 436, to the first end of the capacitor 404, and the energy is added to the voltage $V_{in}$ in series. Therefore, as shown in FIG. 2, a voltage $L_X$ at the second end of the inductor 435 is stabilized the voltage $V_{in}$ after a temporary rise to a high voltage level. Components of the voltage $L_X$ exceeding the voltage $H_{CBK}$ at the first end of the capacitor 404 are stored in the capacitor 404 and cause the voltage $H_{CBK}$ to rise.

When the voltage $L_X$ drops below the voltage $H_{CBK}$, the diode 436 is reverse-biased and thus the voltage $H_{CBK}$ at the first end of the capacitor 404 is prevented from flowing backward to the voltage $V_{in}$.

In the SW mode where the signal $C_p$ is at H level, the voltage $V_H$ is gradually attenuated due to power consumption by the load, since stabilization of the voltage $V_H$ achieved by raising the voltage $H_{DBK}$ is not functioned.

When the period $T_{w2}$ has elapsed after the voltage $H_{DBK}$ at the second end of the capacitor 404 has reached the voltage $(V_{in}-V_{def})$, the signal $C_p$ drops to L level again and the constant-voltage mode is entered. In the constant-voltage mode, control is executed again such that the voltage $V_H$ is stabilized at the target voltage $V_A$ by raising the voltage $H_{DBK}$ at the second end of the capacitor 404 in which electric charges are stored.

A large amount of load boosts the speed of raising the voltage $H_{DBK}$ and shortens the period of the constant-voltage mode compared to the case under low-load conditions, as shown in FIG. 2. Regardless of the amount of load, however, the voltage $V_H$ is stabilized at the target voltage $V_A$ in the constant-voltage mode.

In the power-supply circuit 40, in the constant-voltage mode, a transfer of electric charges from the capacitor 404 to the capacitor 402 allows the output voltage $V_H$ to be held at the target voltage $V_A$. In the SW mode, on the other hand, since the output voltage $V_H$ is not affected by switching operations and is attenuated only slightly from the target voltage $V_A$ at which the voltage $V_H$ has been kept constant, ripples in the output voltage $V_H$ can be reduced significantly. A further advantage is that settings for switching operations and the like can be made without any constraints.

This advantage will be described in detail. In a conventional power-supply circuit, a switching operation boosts a voltage according to the amount of energy stored in an inductor. Although a reduction in the amount of energy per switching operation is desirable for reducing ripples, the reduction in the amount of energy causes an increase in the number of switching operations required for obtaining a necessary step-up voltage. This is disadvantageous in terms of power consumption. Thus, settings for switching operations, the number of switching operations, and the like are subject to constraints. On the other hand, the power-supply circuit 40 of the present embodiment is less subject to such constraints, since voltage fluctuations at the time of switching operation affect only the capacitor 404 and not the capacitor 402 that supplies voltage to the load.

In the first embodiment, although a voltage at the feed line connected to the source of the transistor 422 (and to the positive terminal of the reference-voltage supply 424) and a voltage at the feed line connected to first end of the inductor 435 are both voltage $V_{in}$, they may differ from each other.

In the first embodiment, furthermore, negative feedback control is performed over the voltage $H_{DBK}$ at the second end of the capacitor 404 such that the output voltage $V_H$ (hold voltage of the capacitor 402) is held constant at the target voltage $V_A$. Since the hold voltage $(H_{CBK}-H_{DBK})$ of the capacitor 404 is proportional to the amount of rise in the voltage $H_{DBK}$, feed forward control may be applied to the amount of rise in the voltage $H_{DBK}$ according to the hold voltage $(H_{CBK}-H_{DBK})$ of the capacitor 404.

Moreover, although the capacitors 402 and 404 are used to stabilize the voltage $V_H$ in the first embodiment, they are just examples of holding devices. Each of the capacitors 402 and 404 may be replaced with a device having a similar voltage-holding function, for example, with a rechargeable battery. If each of the capacitors 402 and 404 is replaced with such a device of high voltage-holding performance, a transition to the SW mode may become rather unnecessary. In such a case, only stabilization control over the output voltage during the constant-voltage mode may be performed without transition to the SW mode.

Although the power-supply circuit 40 is configured to supply the positive voltage $V_H$ to the load, it may also be configured to supply a negative voltage. For supplying a negative voltage, the voltage at the second end of the capacitor 404 is lowered such that the positive output voltage at the first end of the capacitor 402 is held constant. In either case, the second end of the capacitor 404 is shifted toward the potential at the first end of the capacitor 402.

Second Embodiment

An electro-optical unit according to a second embodiment of the present invention will now be described. The electro-optical unit is configured such that an electro-optical panel is driven by a supply voltage of a power-supply circuit 30 in which the power-supply circuit 40 described above is included.

Figure 5:
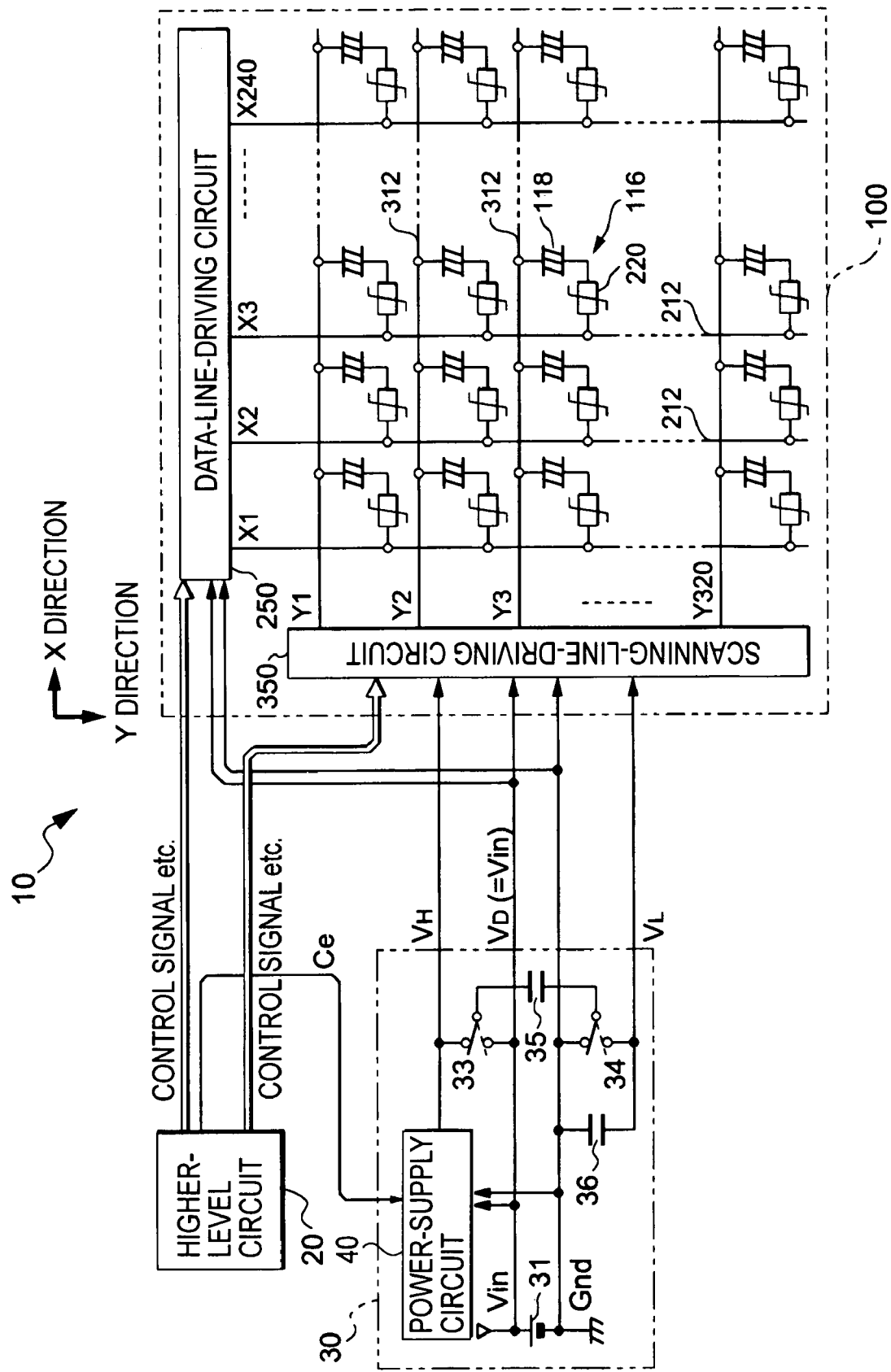
FIG. 5 shows the configuration of an electro-optical unit according to a second embodiment of the present invention.

FIG. 5 is a block diagram showing the overall structure of an electro-optical unit 10.

As shown, the electro-optical unit 10 includes a higher-level circuit 20, the power-supply circuit 30, and an electro-optical panel 100.

The higher-level circuit 20 is for supplying data corresponding to the content to be displayed, various control signals, and the like, to the power-supply circuit 30 and to the electro-optical panel 100. The power-supply circuit 30 includes the above-described power-supply circuit 40 for generating a voltage $V_H$ from a voltage ($V_{in}$-Gnd) of a secondary battery 31, and a charge-pump circuit for reversing the polarity of the voltage $V_H$.

The electro-optical panel 100 includes a device substrate provided with a plurality of data lines 212 extending in the column (Y) direction and a counter substrate provided with a plurality of scanning lines 312 extending in the row (X) direction. The device substrate and the counter substrate are bonded together, with a certain space therebetween, such that their electrode surfaces are opposite to each other. The space therebetween is filled with, for example, twisted-nematic (TN) liquid crystal.

Pixels 116 corresponding to the respective intersections of the data lines 212 and the scanning lines 312 are provided. Each pixel 116 includes a liquid-crystal layer 118 and a thin film diode (hereinafter, simply referred to as TFD) 220 that are connected in series. For convenience of explanation, assume that the total number of scanning lines 312 is 320, the total number of data lines 212 is 240, and the pixels 116 are arranged in a matrix with 320 rows and 240 columns. The pixel arrangement of the electro-optical panel 100 is not limited to that described above.

First end of a TFD 220 is connected to a data line 212, while the second end of the TFD 220 is connected to a rectangular pixel electrode (not shown) opposite a scanning line 312 serving as a stripe electrode.

Thus, a liquid-crystal layer 118 is structured such that liquid crystal is interposed between the scanning line 312 serving as a stripe electrode and the rectangular pixel electrode. Non-facing surfaces of both substrates described above are provided with respective polarizers (not shown) such that the amount of light passing though the liquid-crystal layer 118 is changed according to the rms value of the voltage across both electrodes.

The TFD 220 has a sandwich structure in which an insulator is interposed between conductors (conductor/insulator/conductor), and has diode switching characteristics according to which current-voltage characteristics become nonlinear in both the positive and negative directions. Therefore, the TFD 220 is in a conductive (ON) state when the voltage across its both ends is above or equal to the threshold, and is in a non-conductive (OFF) state when the voltage across its both ends is less than the threshold.

A scanning-line-driving circuit 350, as will be described below, supplies scanning signals Y1 to Y320 to the respective scanning lines 312 of the 1st to 320th rows. A data-line-driving circuit 250, as will be described below, supplies data signals X1 to X240, corresponding to the content to be displayed, to the respective data lines 212 of the 1st to 240th columns.

Voltage waveforms of driving signals supplied to the electro-optical panel 100 will now be described with reference to FIG. 6.

As illustrated, the scanning-line-driving circuit 350 selects one scanning line 312 in each horizontal-scanning period (1H) sequentially from the beginning of one vertical-scanning period (1F), and applies a selection voltage $V_H$ or a selection voltage $V_L$ to the scanning line 312 in the second half of the horizontal-scanning period (1H) while applying non-selection (hold) voltage $V_D$ or Gnd in the other period.

The non-selection voltages $V_D$ and Gnd are the voltages at which the TFD 220 is brought into the non-conductive state when applied to the scanning line 312, regardless of the voltage of the data signal supplied to the data line 212. On the other hand, the selection voltages $V_H$ and $V_L$ are the voltages at which the TFD 220 is brought into the conductive state when applied to the scanning line 312, regardless of the voltage of the data signal supplied to the data line 212. The selection voltages $V_H$ and $V_L$ and the non-selection voltages $V_D$ and Gnd are symmetric with respect to their hypothetical midpoint potential $V_C$. Here, the selection voltage $V_H$ is higher than the selection voltage $V_L$. In the electro-optical unit 10, the polarity of a drive voltage is determined based on the midpoint potential $V_C$, instead of the ground potential Gnd; that is, a voltage of a higher level with reference to the midpoint potential $V_C$ is a positive voltage, while a voltage of a lower level with reference to the midpoint potential $V_C$ is a negative voltage.

The voltage of each of the scanning signals Y1 to Y320 is determined according to the selection state of the corresponding scanning line 312. In the scanning signals Y1 to Y320 in FIG. 5, a scanning signal supplied to the scanning line 312 of the i-th (i is an integer satisfying $1 \leq i \leq 320$) row from the top is indicated by Yi to give a generalized description. First, after the application of the selection voltage $V_H$ in the second half of a horizontal-scanning period (1H) in which the scanning line 312 of the i-th row is selected, the scanning signal Yi is held at the non-selection voltage $V_D$. Second, after the application of the selection voltage $V_H$, when one vertical-scanning period (1F) has elapsed and the scanning line 312 of the i-th row is selected again, the selection voltage $V_L$ is applied in the second half of a horizontal-scanning period (1H) and held at the non-selection voltage Gnd. This cycle is repeated.

Then, the scanning signal Y (i+1) supplied to the scanning line 312 of the (i+1)-th row, which is subsequent to the i-th row, is brought to the negative selection voltage $V_L$ immediately after the period in which the selection voltage $V_H$ is applied in the case of the scanning signal Yi, while the scanning signal Y (i+1) is brought to the negative selection voltage $V_H$ immediately after the period in which the selection voltage $V_L$ is applied in the case of the scanning signal Yi. In other words, in the scanning signals Y1 to Y320, the selection voltage $V_H$ and $V_L$ are alternately selected in each horizontal-scanning period.

The data-line-driving circuit 250 assigns a data voltage $V_D$ or Gnd to a row of pixels 116 corresponding to a scanning line 312 selected by the scanning-line-driving circuit 350, according to the contents to be displayed on the pixels 116, and supplies it as a data signal via a data line 212.

In the present embodiment, voltages $V_{in}$ and Gnd serving as bases for raising voltages in the power-supply circuit 40 can also be used as the data voltages $V_D$ and Gnd. Moreover, although the data voltages $V_D$ and Gnd can also be used as the non-selection voltages for the scanning signals, additional data voltages or non-selection voltages for scanning signals may be generated such that both are different from each other.

In the data signals X1 to X240 in FIG. 5, a data signal supplied to the data line 212 of the j-th (j is an integer satisfying $1 \leq i \leq 240$) column from the left will be indicated by Xj to give a generalized description. The assumption here is that a scanning line 312 of the i-th row is selected, while the liquid-crystal layer 118 is in the normally-white mode in which the maximum amount of light passes through when no voltage is applied.

Here, the correspondence between the scanning signal Yi and the data signal Xj is as follows. When the content of the pixel 116 in the i-th row and j-th column corresponding to the intersection of the selected scanning line 312 of the i-th row and the data line 212 of the j-th column is displayed in an OFF-display mode (white display at the maximum brightness), if the scanning signal Yi is at a higher-level selection voltage $V_H$ in the second half of the horizontal-scanning period in which the scanning line 312 of the i-th row is selected, the data signal Xj is at a lower-level voltage Gnd in the first half of the horizontal-scanning period (1H) while being at a higher-level voltage $V_D$ of the same polarity as the selection voltage in the second half of the horizontal-scanning period (1H). On the other hand, if the scanning signal Yi is at a lower-level selection voltage $V_L$ in the second half of the horizontal-scanning period in which the scanning line 312 of the i-th row is selected, the data signal Xj is at a higher-level voltage $V_D$ in the first half of the horizontal-scanning period (1H) while being at a lower-level voltage Gnd of the same polarity as the selection voltage in the second half of the horizontal-scanning period (1H).

When the content of the pixel 116 in the i-th row and j-th column is displayed in an ON-display mode (black display at the minimum brightness), if the scanning signal Yi is at a higher-level selection voltage $V_H$ in the second half of the horizontal-scanning period during which the scanning line 312 of the i-th row is selected, the data signal Xj is at a higher-level voltage $V_D$ in the first half of the horizontal-scanning period (1H) while being at a lower-level voltage Gnd of the reverse polarity of the selection voltage in the second half of the horizontal-scanning period (1H). On the other hand, if the scanning signal Yi is at a lower-level selection voltage $V_L$ in the second half of the horizontal-scanning period in which the scanning line 312 of the i-th row is selected, the data signal Xj is at a lower-level voltage Gnd in the first half of the horizontal-scanning period (1H) while being at a higher-level voltage $V_D$ of the reverse polarity of the selection voltage in the second half of the horizontal-scanning period (1H).

To display in the mode intermediate between both (although not particularly shown), it is configured, in the second-half period in which a selection voltage is applied, such that the period of a voltage having the reverse polarity of the selection voltage becomes longer as the state changes from white to black, and such that, in the first-half period, the voltage has the reverse polarity of the voltage in the second-half period.

In the pixel 116, when a selection voltage is applied in the second half of a selection period, the TFD 220 is turned on to cause a voltage corresponding to a display content to be written into the liquid-crystal layer 118. The TFD 220 is turned off and the voltage written to the liquid-crystal layer 118 is maintained in the other periods.

The voltage applied to the liquid-crystal layer 118 is an alternating drive voltage that reverses its polarity with respect to the hypothetical midpoint potential $V_C$ in each vertical-scanning period. This prevents liquid crystal from being deteriorated.

As described above, a selection voltage is applied to a scanning signal Yi in half a horizontal-scanning period (1/2H), instead of being applied in one horizontal-scanning period, and a data signal Xj is applied separately in two periods. Therefore, regardless of the display pattern, the data signal Xj is at a higher-level voltage $V_D$ in a half of one horizontal-scanning period (1H) while being at a lower-level voltage Gnd in the other half of the same period. Since, in a non-selection period, the rms value of a voltage applied to the TFD 220 is held constant regardless of the display content, the amount of off-leakage current in each TFD 220 of every pixel 116, in the non-selection period, is the same. The occurrence of so-called image trailing can thus be prevented.

No further description will be given here, as the present invention is not concerned with the drive waveform itself. However, what is to be mentioned here first is that the scanning-line-driving circuit 350 generates the scanning signals Y1 to Y320 using a voltage from the power-supply circuit 40 as a selection voltage, and second, the selection voltage $V_H$ is used as a scanning signal for a limited period of time.

In other words, the first point is that although the above-described power-supply circuit 40 generates the voltage $V_H$ only, the electro-optical panel 100 also requires the voltage $V_L$ for alternating drive for liquid crystal. Therefore, the charge-pump circuit is added to the power-supply circuit 40 in the power-supply circuit 30 (see FIG. 5) applied to the electro-optical panel 100.

The charge-pump circuit includes a double-throw switch 33, a double-throw switch 34, a capacitor 35, and a capacitor 36, and is configured as follows. The double-throw switches 33 and 34, in conjunction with one another, alternately select one or the other of their selection terminals at regular time intervals. One selection terminal of the double-throw switch 33 is connected to a supply line for the voltage $V_H$, the other selection terminal is connected to a supply line for the voltage $V_{in}$, and a common terminal is connected to one terminal of the capacitor 35. One selection terminal of the double-throw switch 34 is grounded at the potential Gnd, the other selection terminal is connected to a supply line for the voltage $V_L$, and a common terminal is connected to the other terminal of the capacitor 35. The capacitor 36 is placed between the ground potential Gnd and the supply line for the voltage $V_L$.

When each of the double-throw switches 33 and 34 selects one of the selection terminals as indicated by solid lines in FIG. 5, the capacitor 35 is charged under the condition that its higher end is at the selection voltage $V_H$ and its lower end is at the ground potential Gnd.

When each of the double-throw switches 33 and 34 selects the other of the selection terminals as indicated by broken lines in FIG. 5, the voltage at the higher end of the capacitor 35 is lowered to the voltage $V_{in}$. Accordingly, the potential at the lower end of the capacitor 35 is lowered from the ground potential Gnd by the amount of variation at the higher level ($V_H$-$V_{in}$). Thus, the polarity of the potential of the supply line connected to the lower end of the capacitor 35 is reversed, with respect to the potential $V_C$, from the selection voltage $V_H$ to the selection voltage $V_L$ having a negative polarity.

When each of the double-throw switches 33 and 34 selects one of the selection terminals again, the capacitor 35 is charged under the condition that its higher end is at the selection voltage $V_H$ and its lower end is at the ground potential Gnd. Then the same operation will be repeated. In the period in which each of the double-throw switches 33 and 34 selects one of the selection terminals, the selection voltage $V_L$ is held in the capacitor 36. The charge-pump circuit allows the selection voltage $V_L$ as well as the selection voltage $V_H$ to be generated from the voltage ($V_{in}$-Gnd) of the secondary battery 31.

The second point described above will now be discussed. In the present embodiment, the selection voltages $V_H$ and $V_L$ are alternately used in each horizontal-scanning period. The period in which the selection voltages $V_H$ and $V_L$ are applied to the scanning line 312 is not one entire horizontal-scanning period, but is the second half of the horizontal-scanning period (1/2H). Therefore, the period in which the selection voltage $V_H$ from the power-supply circuit 30 is actually applied to any of the scanning lines 312 is only one-quarter of all the horizontal-scanning periods. However, fluctuations in the voltage $V_H$ cause fluctuations in the voltage held in the liquid-crystal layer 118 when the TFD 220 is turned on, lead to varying rms values of voltage among the pixels, and result in degradation of the display quality.

Therefore, it is configured, in the second embodiment, such that the period in which the voltage $V_H$ is used as a selection voltage for the scanning line 312 is the above-described constant-voltage mode, in order to stabilize the output voltage $V_H$ of the power-supply circuit 30; and such that the period in which the voltage $V_H$ is not used as a selection voltage for the scanning line 312 is the above-described SW mode, in order to permit switching, in the power-supply circuit 30, for storing electric charges in the capacitor 404.

Figure 6:
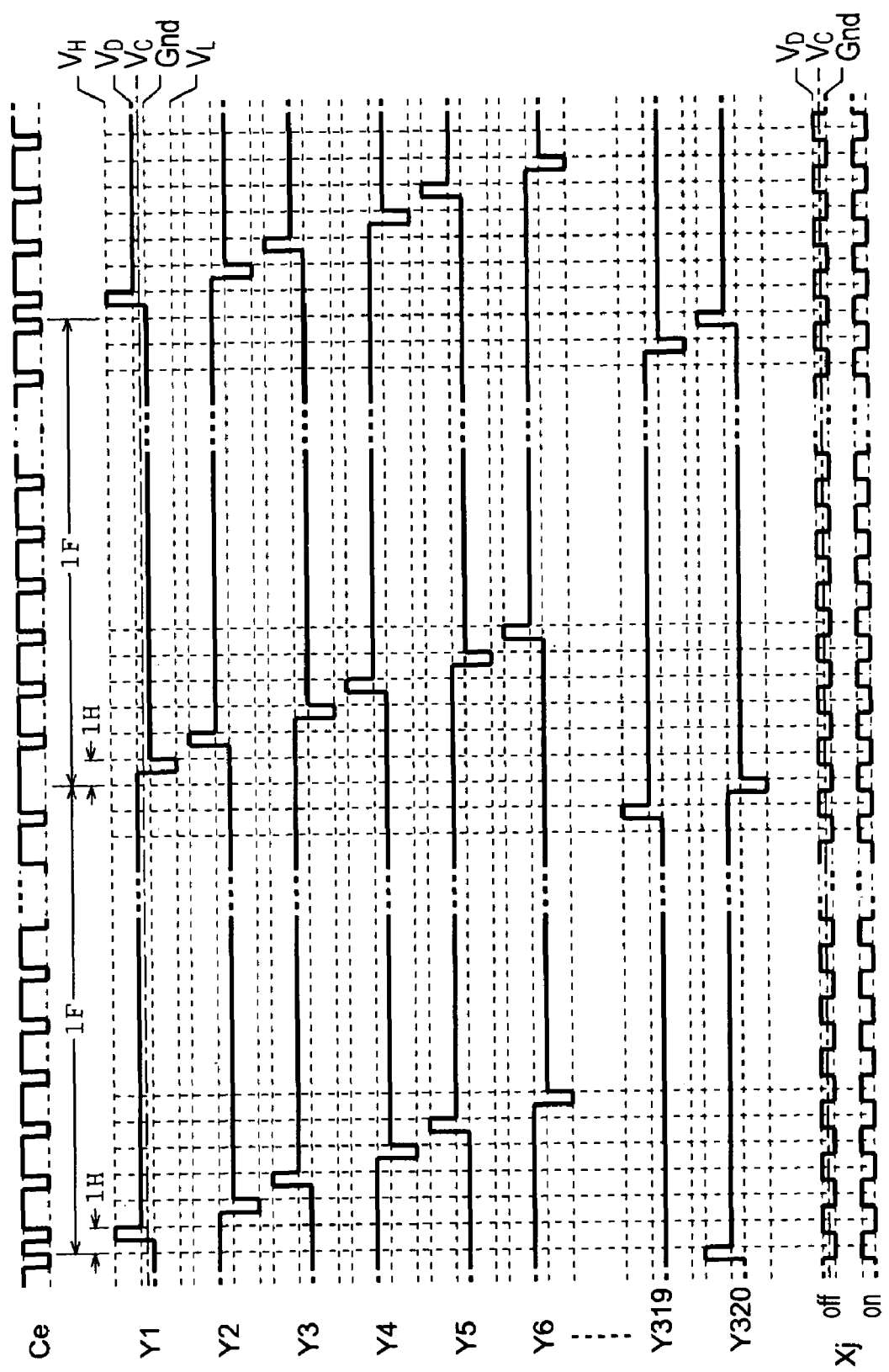
FIG. 6 is a waveform diagram for explaining the operation of the electro-optical unit.

Specifically, the power-supply circuit 40 is supplied, from the higher-level circuit 20, with a signal $C_e$, which is at an L level in a period $T_{w2}$ required for switching as well as in a period immediately after the period $T_{w2}$ and in which the voltage $V_H$ is used as a selection voltage; while being at an H level in the other periods (see FIG. 6). Since the period $T_{w2}$ is shorter than the period in which the voltage $V_H$ is used as a selection voltage, the period in which the signal $C_e$ is at the L level seems to be equal, due to the scale in FIG. 6, to the period in which the voltage $V_H$ is used as a selection voltage. In reality, however, the period $T_{w2}$ elapses from the point at which the signal $C_e$ is brought to the L level until the start of the period in which the voltage $V_H$ is used as a selection voltage.

In addition, it is desirable that a voltage $V_{def}$ be set rather low, according to the maximum load, such that the necessary amount of electric charges can be stored in the capacitor 404.

In the power-supply circuit 40, as described above, when the voltage $H_{DBK}$ at the second end of the capacitor 404 reaches the voltage $(V_{in}-V_{def})$, the control circuit 430 brings the signals $T_{on}$ and $C_p$ to the H level only in cases in which the signal $C_e$ is at the H level. Therefore, to avoid overlap with the period in which the voltage $V_H$ is used as a selection voltage for the scanning line 312, the power-supply circuit 30 is switched to the above-described SW mode and performs switching for storing electric charges in the capacitor 404. On the other hand, in the period in which the voltage $V_H$ is used as a selection voltage for the scanning line 312, the power-supply circuit 30 is fixed at the above-described constant-voltage mode and performs control for stabilizing the output voltage $V_H$ at the target voltage $V_A$.

Therefore, in the present embodiment, degradation of the display quality due to voltage fluctuations can be prevented since the selection voltage $V_H$ is held constant at the target voltage $V_A$ in the period in which the selection voltage $V_H$ is used as a selection voltage.

Moreover, since a charge pump is a load, the configuration may be set such that switching of the double-throw switches 33 and 34 is prohibited in the period in which the voltage $V_H$ is used as a selection voltage.

Furthermore, although the power-supply circuit 30 generates the positive selection voltage $V_H$ in the second embodiment, the configuration may be modified such that the power-supply circuit 30 generates the negative selection voltage $V_L$, whose polarity is then reversed by the charge-pump circuit to generate the positive selection voltage $V_H$.

In the drive waveforms shown in FIG. 6, one horizontal-scanning period (1H) is divided into two periods, and a selection voltage is applied in the second half period. However, the selection voltage may be applied in the first half period or during the one horizontal-scanning period (1H) without dividing it into two half-periods. In such configurations, mode transitions are still properly determined according to the signal $C_e$.

Although the electro-optical panel 100 of the present embodiment operates in the normally-white mode in which white is displayed when no voltage is applied, the electro-optical panel 100 may operate in the normally-black mode, instead, in which black is displayed when no voltage is applied.

The electro-optical panel 100 is not limited to a transmissive-type panel, but may be a reflective-type panel or a transflective-type panel that is in between the transmissive-type panel and the reflective-type panel. Moreover, although, in the electro-optical panel 100, the TFD 220 is connected to the data line 212 while the liquid-crystal layer 118 is connected to the scanning line 312, the TFD 220 and the liquid-crystal layer 118 may be connected to the scanning line 312 and the data line 212, respectively.

The TFD 220 is just an example of a two-terminal switching device. Devices using, for example, a zinc oxide (ZnO) varistor and a metal semi-insulator (MSI), and two such devices connected, in the reverse direction, in series or in parallel can also be used as a two-terminal switching device.

Although a two-terminal switching device, such as the TFD 220, is used as an active device in the embodiment, a three-terminal switching device, such as a thin film transistor (TFT) can also be used.

Although TN liquid crystal is applied and described in the embodiment, other types of liquid crystal, such as super twisted-nematic (STN) liquid crystal and guest-host liquid crystal, are also applicable. In the guest-host type, an anisotropic dye (guest), in which absorbencies of visible light are different in the major and minor axis directions of molecules, is dissolved in liquid crystal (host) with a certain molecular arrangement, and as a result, dye molecules and liquid crystal molecules are arranged in parallel. Moreover, vertical alignment (homeotropic alignment) and parallel (horizontal) alignment (homogeneous alignment) may also be applied. In the vertical alignment, liquid crystal molecules are aligned vertically with respect to both substrates when no voltage is applied, while liquid crystal molecules are aligned horizontally with respect to both substrates when a voltage is applied. In the parallel alignment, liquid crystal molecules are aligned horizontally with respect to both substrates when no voltage is applied, while liquid crystal molecules are aligned vertically with respect to both substrates when a voltage is applied. As described above, various types of liquid crystal and its alignment can be applied as long as they are suitable for the drive method of the present invention.

Moreover, the present invention is also applicable to electro-optical units, in addition to the liquid-crystal devices described above, such as organic electroluminescent (EL) devices, fluorescent display tubes, electrophoresis units, and plasma displays.

The pixels 116 may be arranged in such a way that they correspond to the respective primary colors red (R), green (G), and blue (B), and that three pixels make up a single dot for performing color display.

Figure 7:
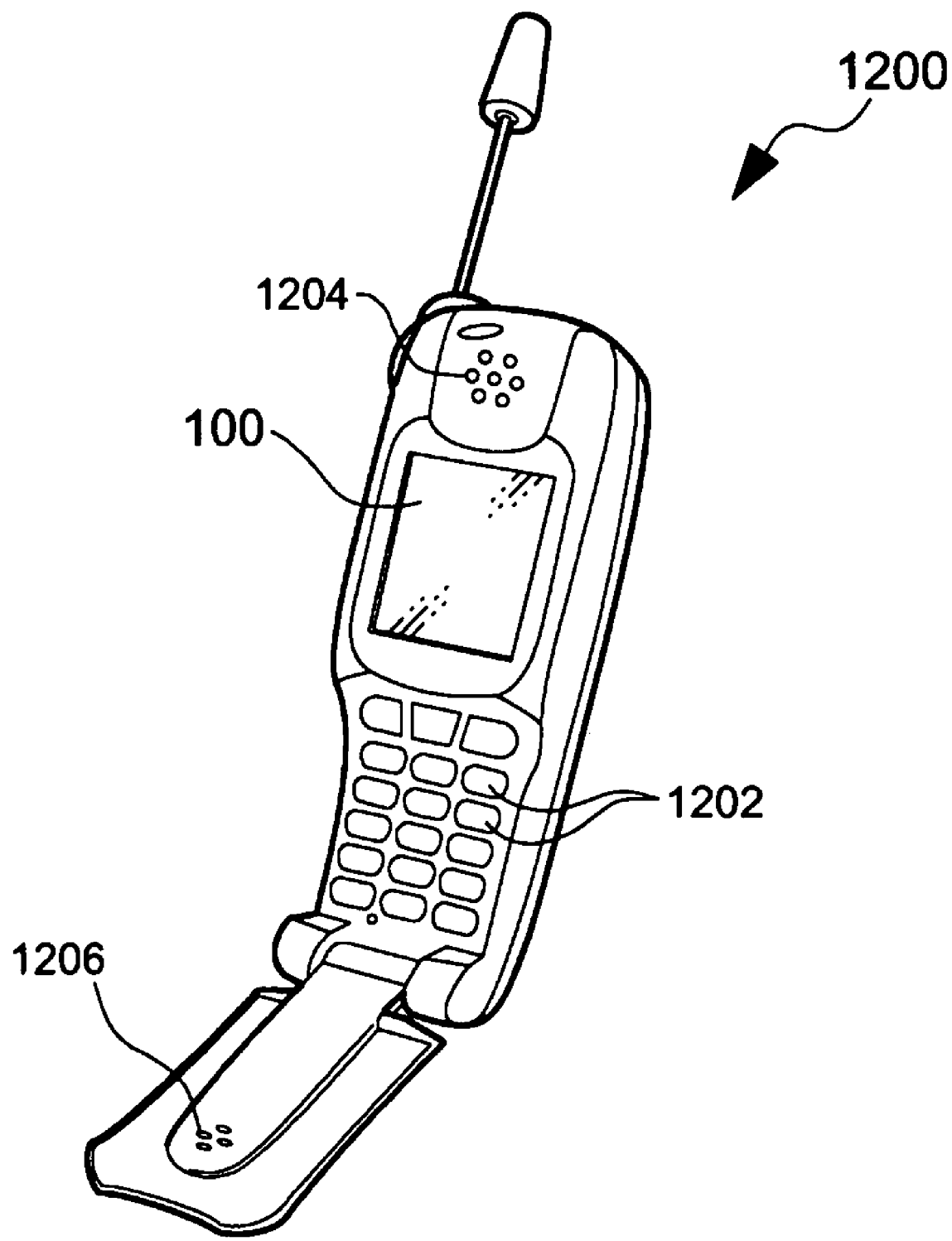
FIG. 7 shows a mobile phone to which the electro-optical unit is applied.

An electronic apparatus that includes the electro-optical unit 10 of the above-described embodiments as a display unit will now be described. FIG. 7 is a perspective view showing the structure of a mobile phone 1200 in which the electro-optical unit 10 of the embodiments is included.

As shown, the mobile phone 1200 includes a plurality of operation buttons 1202, an earpiece 1204, and a mouthpiece 1206 as well as the electro-optical panel 100 described above. Components of the electro-optical unit 10, other than the electro-optical panel 100, cannot be seen from the outside as they are internally mounted in the phone.

The application of the electro-optical panel 100 serving as a display for the mobile phone 1200 prevents fluctuations in selection voltages and ensures high-quality display.

Besides the mobile phone 1200 shown in FIG. 7, examples of an electronic apparatus to which the electro-optical unit 10 is applied include a digital still camera, a notebook computer, a liquid-crystal television, a viewfinder-type (or monitor-direct-view-type) video recorder, a car navigation system, a pager, an electronic notepad, a calculator, a word processor, a workstation, a videophone, a point-of-sale (POS) terminal, and equipment with a touch panel. It is obvious that the electro-optical unit 10 is applicable, as a display unit, to various types of electronic apparatuses in addition to those described above, and the power consumption of any of the electronic apparatuses can be kept low.

What is claimed is:

1. A voltage-supply circuit comprising:
    a first holding device including a first end and a second end with a voltage held therebetween, the first holding device supplying the voltage to a load;
    a second holding device including a first end and a second end with a voltage held therebetween, the first end being electrically connected to the first end of the first holding device; and
    a potential-control circuit that receives a signal based on at least one of the voltages held at the first and second holding devices and shifts potential at the second end of the second holding device toward potential at the first end of the first holding device in response to the signal.

2. The voltage-supply circuit according to claim 1, wherein the potential-control circuit shifts the potential at the second end of the second holding device such that the voltage held at the first holding device becomes equal to a predetermined target voltage.

3. The voltage-supply circuit according to claim 2, wherein the potential-control circuit includes:
    an operational amplifier input with a voltage corresponding to the hold voltage of the first holding device and a reference voltage corresponding to the target voltage; and
    a transistor with a source and a drain that are located between a predetermined potential line and the first holding device and are electrically connected thereto.

4. A method for supplying the voltage held between a first end and a second end of a first holding device to a load, wherein:
    according to the voltage held at the first holding device or at a second holding device having a first end electrically connected to the first end of the first holding device, potential at the second end of the second holding device is shifted toward potential at the first end of the first holding device.

5. A power-supply circuit comprising:
    a first holding device including a first end and a second end with a voltage held therebetween, the first holding device supplying the voltage to a load;
    a second holding device including a first end and a second end with a voltage held therebetween, the first end being electrically connected to the first end of the first holding device;
    a threshold determiner that determines whether or not potential at the second end of the second holding device reaches a predetermined threshold;
    a switch that, during a first mode, turns on and off at least once when the threshold determiner determines that the threshold is reached; and
    a potential-control circuit that receives a signal based on at least one of the voltages held at the first and second holding devices and, in response to the signal:
    in the first mode brings the potential at the second end of the second holding device to a predetermined potential and controls so that the voltage generated by turning on and off the switch is held in the second holding device; and
    in a second mode, shifts the potential at the second end of the second holding device, according to the voltage held at the first holding device or second holding device, toward potential at the first end of the first holding device.

6. The voltage-supply circuit according to claim 5, wherein the potential-control circuit comprises:
    an operational amplifier to which a voltage corresponding to the hold voltage of the first holding device and a reference voltage corresponding to the target voltage are inputted; and
    a first transistor and a second transistor connected in series between predetermined voltages; wherein
    the second end of the first holding device is electrically connected to a drain of the first transistor and to a drain of the second transistor;
    an output signal of the operational amplifier is supplied to a gate of the first transistor; and
    the second transistor is in an ON state in the first mode and is in an OFF state in the second mode.

7. The voltage-supply circuit according to claim 5, further comprising an inductor for storing power when the switch is in an ON state, while releasing power when the switch is in an OFF state; wherein
    the second holding device holds a voltage at which power is released from the inductor.

8. An electro-optical unit comprising:
    the power-supply circuit according to claim 5;
    pixels, each corresponding to each of the intersections of a plurality of scanning lines and a plurality of data lines;
    a scanning-line-driving circuit for sequentially selecting the scanning lines and applying the voltage held in the first holding device as a selection voltage to a scanning line selected; and
    a data-line-driving circuit for supplying a data signal, via a data line, to a pixel corresponding to a scanning line to which a selection voltage is applied.

9. The electro-optical unit according to claim 8, wherein the power-supply circuit is in the second mode during the period in which a voltage held in the first holding device is applied as a selection voltage.

10. An electronic apparatus comprising the electro-optical unit according to claim 8.

* * * * *